United States Patent [19]

Saito et al.

[11] Patent Number: 5,132,348

[45] Date of Patent: Jul. 21, 1992

[54] RUBBER COMPOSITION FOR TREAD IN HIGH-SPEED RUNNING TIRES

[75] Inventors: Tadashi Saito; Joji Yatsunami, both of Tokyo; Ichiro Wada; Toshiki Takizawa, both of Kodaira, all of Japan

[73] Assignee: Bridgestone Corporation, Tokyo, Japan

[21] Appl. No.: 545,090

[22] Filed: Jun. 28, 1990

[30] Foreign Application Priority Data

Jun. 29, 1989 [JP] Japan ................... 1-165276

[51] Int. Cl.$^5$ ................... C08K 3/04; C08K 5/01; C08K 5/17; C08L 15/02
[52] U.S. Cl. ................... 524/252; 524/484; 524/485; 524/486; 525/332.3; 525/359.4
[58] Field of Search ............... 524/496, 252, 484, 485, 524/486, 496; 525/332.3, 359.4

[56] References Cited

U.S. PATENT DOCUMENTS

| | | | |
|---|---|---|---|
| 2,831,839 | 4/1958 | Canterino | 525/332.3 |
| 3,551,394 | 12/1970 | Sakuragi | 525/332.3 |
| 3,755,261 | 8/1973 | Van Gulick | 525/332.3 |
| 3,891,606 | 6/1975 | Kogon | 525/332.3 |

FOREIGN PATENT DOCUMENTS 0328291  8/1989  European Pat. Off. ......... 525/359.4

Primary Examiner—Kriellion S. Morgan
Assistant Examiner—Peter Szekely
Attorney, Agent, or Firm—Sughrue, Mion, Zinn, Macpeak & Seas

[57] ABSTRACT

A tread rubber composition for high-speed running tires comprises a particular halogenated modified styrene-butadiene copolymer having p-halomethylbenzoyl group as a starting rubber and contains particular amounts of carbon black, process oil and diamine, and has excellent heat resistance and wear resistance.

11 Claims, No Drawings

RUBBER COMPOSITION FOR TREAD IN HIGH-SPEED RUNNING TIRES

BACKGROUND OF THE INVENTION

1. Field of the Invention

This invention relates to rubber compositions for tread in high-speed running tire, and more particularly to a tread rubber composition for high-speed running tires having improved heat resistance and wear resistance.

2. Related Art Statement

In high-speed running tires such as general-purpose passenger car tire running at a speed of not less than 100 km/h on expressways or the like, sport car tire, motor sport tire, racing tire and so on, the tread rubber is subjected to dynamic compression deformation from road surface at a high frequency during the high-speed running, so that the heat build-up is large, and particularly it reaches to a temperature of not lower than 200° C. at a tread portion showing an extremely high ground contact pressure and a strain concentrated portion due to ununiform deformation in a block pattern formed in the tread to raise a risk of blow-out, and consequently it is required to have a sufficient heat resistance.

Especially, the tread rubber of the high-speed running tire is required to ensure a stable steering stability that a will of a driver is surely transmitted to a road surface. For this end, it is necessary that the resistance to slipping friction between road surface and tread rubber is made large to sufficiently overcome inertia force of momentum in car at the braking, centrifugal force at the cornering and driving force of tire at the starting. In order to make the resistance to slipping friction large, it is required to make the hardness of the tread rubber small so as to enhance the ground contacting area between road surface and tread rubber. In this case, the deformation strain of rubber due to the ground contact pressure from road surface becomes rather large, and consequently the heat build-up increases to enhance the risk of blow-out. From this point, the tread rubber for high-speed running tire is demanded to have a severer heat resistance.

In general, a method of adding an aromatic oil to rubber is carried out as a means for reducing the hardness of the tread rubber to improve the gripping property of the tire. However, this method degrades the wear resistance and fracture strength to create many breakages of the tread rubber (cut, chipping), so that it is unsuitable for the high-speed running tire.

As a conventional means for improving the heat resistance of rubber, there is a method wherein the number of double bonds in the polymer itself is reduced as far as possible. In this case, however, the stretchability of rubber itself is lost to produce a rigid rubber, so that this method is also unsuitable for the high-speed running tire.

Further, there are a method wherein polysulfide crosslinked networks are decreased as far as possible and monosulfide crosslinked networks having a strong bonding force are increased by increasing the amount of vulcanization accelerator and reducing the amount of sulfur to improve the heat resistance of rubber composition, and a method of directly forming strong C—C bond between polymers as in peroxide vulcanization to largely improve the heat resistance. The former method certainly improves the heat resistance, but is still insufficient in the heat resistance required in the high-speed running tire. The latter method largely improves the heat resistance, but loses the stretchability of rubber to considerably degrade the mechanical fatigue properties, so that it is not suitable for the high-speed running tire.

SUMMARY OF THE INVENTION

It is, therefore, an object of the invention to provide a rubber composition for tread in high-speed running tire having sufficient heat resistance and improved wear resistance.

As previously mentioned, the aforementioned problems can not be solved by the conventional techniques for the improvement of heat resistance and gripping property. Therefore, the inventors have made studies with respect to a new countermeasure and confirmed that these problems can surprisingly be solved by compounding large amounts of carbon black and process oil with a particular halogenated modified styrene-butadiene copolymer in the presence of diamine as a crosslinking agent, and as a result the invention has been accomplished.

According to the invention, there is the provision of a rubber composition for tread in high-speed running tire comprising (a) 70-190 parts by weight of carbon black, (b) 50-285 parts by weight of process oil and (c) 0.3-10 parts by weight of a diamine represented by a general formula of $H_2N-R-NH_2$ (wherein R is a bivalent hydrocarbon residue having a carbon number of not more than 20) based on 100 parts by weight of a starting rubber consisting of 60-100 parts by weight of a halogenated modified styrene-butadiene copolymer having p-halomethylbenzoyl group represented by the following general formula:

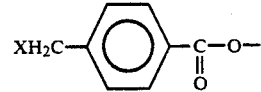

(wherein X is a halogen atom) in its molecule and 40-0 parts by weight of another conjugated diene polymer.

DESCRIPTION OF THE PREFERRED EMBODIMENTS

The halogenated modified styrene-butadiene copolymer used in the invention has a structure that p-halomethylbenzoyl group is partly added to carbon-carbon double bonds in main chain and side chain of styrene-butadiene copolymer molecule.

The content of p-halomethylbenzoyl group is preferable within a range of 0.001-0.03 gram equivalent per 100 g of the halogenated modified styrene-butadiene copolymer. When the content is less than 0.001 gram equivalent, the amine crosslinking density is small and insufficient and the effect of improving the heat resistance, high temperature fracture properties and wear resistance is not sufficient, while when it exceeds 0.03 gram equivalent, the number of double bonds in the halogenated modified styrene-butadiene copolymer is small and the stretchability of rubber is lost to make rubber rigid and the performances as a tread for the high-speed running tire are still unsatisfactory.

The above halogenated modified styrene-butadiene copolymer is produced by reacting p-halomethyl benzoic acid such as p-bromomethyl benzoic acid and an alkylhypohalide such as tert-butylhypochloride with styrene-butadiene copolymer to cause the following addition reaction in the double bond of the copolymer chain:

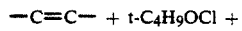

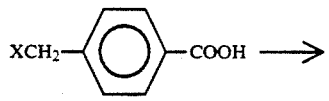

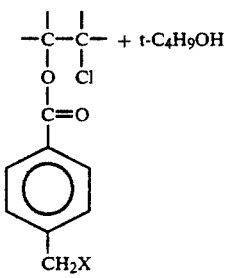

This reaction is easily progressed by heating the reactants in an organic solvent such as toluene or the like. The content of p-halomethylbenzoyl group can easily be controlled by adjusting the amount of p-halomethyl benzoic acid added. The styrene-butadiene copolymer (SBR) used as a starting material includes all of emulsion polymerized SBR, solution polymerized SBR and so on obtained by any synthesis methods. As a halogen (X), use may be made of Cl, Br, I and F, but Br is preferable in a point of easily causing the crosslinking reaction as mentioned below.

When the halogenated modified styrene-butadiene copolymer is vulcanized in the presence of a diamine represented by $H_2N-R-NH_2$, the crosslinking reaction as shown below is caused to form a strong crosslinked bond having a high heat resistance:

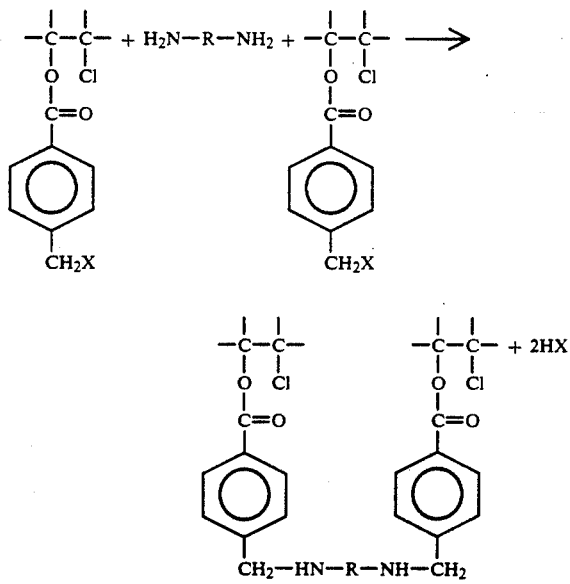

As the diamine, mention may be made of aliphatic primary diamines such as hexamethylenediamine, 1,7-diaminoheptane, 1,10-diaminodecane, 1,12-diaminododecane and the like; alicyclic primary diamines such as 4,4'-methylene biscyclohexyl amine, 3,3'-dimethyl-4,4'-diaminocyclohexyl methane, 1,3-bis(aminomethyl) cyclohexane and the like; aromatic primary diamines such as 4,4'-methylene dianiline, 4,4'-diaminodiphenyl methane, 4,4'-diaminodiphenyl ether, 4,4'-diaminodiphenyl sulfone p-phenylene diamine, benzidine and the like; aralkyl type primary diamines such as xylylene diamine and the like; heterocyclic primary diamines such as 3,9-bis(aminoalkyl)-2,4,8,10'-tetraoxaspiro(5,5) undecane and the like; and polyether primary diamines such as polyoxypropylene diamine having the following formula:

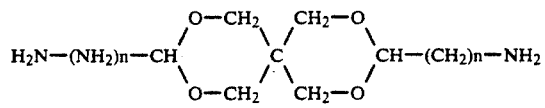

(n=1-12). Among them, 4,4'-methylene biscyclohexyl amine and 4,4'-methylene dianiline are preferable, and also diamines having a long molecular chain such as 1,12-diaminododecane or the like are preferable because they are excellent in the fracture properties.

When the amount of diamine added is less than 0.3 part by weight per 100 parts by weight of the starting rubber, the amine crosslinking density is small and the sufficient heat resistance is not obtained, while when it exceeds 10 parts by weight, the improvement of the heat resistance is saturated and the heat resistance is not further improved.

In case of the conventional tread rubber composition for the high-speed running tire, SBR rubber having a high heat resistance and a large tan δ as a loss property is generally used as a polymer, and further 70–190 parts by weight of carbon black is added for making tan δ large to enlarge the friction resistance between tread rubber and road surface and 50–190 parts by weight of aromatic oil or the like as a softening agent is added for softening rubber, so that the heat resistance of rubber is considerably degraded.

According to the invention, the heat resistance is considerably improved by the halogenated modified styrene-butadiene copolymer and the diamine, so that sufficient heat resistance as a tread rubber for the high-speed running tire can be achieved even when carbon black and process oil are added in high amounts of 70–190 parts by weight and 50–285 parts by weight, respectively.

As the carbon black used in the invention, ISAF, SAF grade carbon blacks having a specific surface area of nitrogen adsorption of not less than 120 m²/g are preferable. When the amount of carbon black added is less than 70 parts by weight, the friction coefficient to road surface is insufficient, while when it exceeds 190 parts by weight, the kneading operation with rubber is degraded, and it is difficult to disperse carbon black into rubber, and the heat resistance is poor.

As the process oil, mention may be made of aromatic oil, naphthenic oil and SBR or polyisoprene series low molecular weight liquid rubber. Particularly, the use of aromatic oil is preferable. When the amount of the process oil is less than 50 parts by weight, the friction coefficient to road surface is small, while when it exceeds 285 parts by weight, the kneading operability is poor.

As the starting rubber, conjugated diene polymer to be blended with the halogenated modified styrene-butadiene copolymer is not particularly restricted. In general, natural rubber (NR), polyisoprene rubber, emulsion polymerized styrene-butadiene copolymer rubber, solution-polymerized styrene-butadiene copolymer rubber, polybutadiene rubber (BR) and the like are used. When the amount of the conjugated diene polymer exceeds 40 parts by weight, the improvement of heat resistance in the tread rubber is insufficient, so that the amount should be restricted to not more than 40 parts by weight.

In the rubber composition according to the invention, it is possible to use a vulcanizing agent such as sulfur usually used, a vulcanization accelerator, an accelerator activator and the like together.

The following examples are given in illustration of the invention and are not intended as limitations thereof.

In these examples, the properties after the rubber composition is vulcanized at 145° C. for 45 minutes are evaluated as follows:

Heat resistance

A dynamic strain of 25% is given to the vulcanizate at 30 Hz by means of Goodrich type flexometer, whereby heat is generated in rubber itself to raise temperature, and then blow-out temperature and time causing blow-out are measured by observing the cut surface of the vulcanizate to confirm the presence or absence of bubbles. These values are indicated by an index as a heat resistance. The larger the index value, the better the heat resistance.

Worn quantity

The worn quantity is measured by means of a Pico abrasion testing machine and indicated by an index. The smaller the index value, the better the wear resistance.

Fracture strength at high temperature

The fracture strength is measured by using a rubber test specimen of JIS No. 3 placing in a thermostatic chamber in air at 80° C., and is indicated by an index.

1. Moreover, SBR #1502 was used as an unmodified SBR.

The brominated modified SBR was produced by a method described in Reference Example 1 as mentioned later, in which the content of p-bromomethylbenzoyl group was 0.01 gram equivalent per 100 g of the halogenated (brominated) modified styrene-butadiene copolymer. The chlorinated modified SBR was produced by the same method as in Reference Example 1 except that p-bromomethyl benzoic acid was used instead of p-bromomethyl benzoic acid, in which the content of p-chloromethylbenzoyl group was 0.01 gram equivalent.

In this compounding recipe, the modulus of elasticity of rubber was large as the increase of amine crosslinking and the heat resistance, wearing property and fracture strength at high temperature could not relatively compared, so that the compounding was adjusted by controlling the amounts of sulfur and vulcanization accelerator added so as to coincide the moduli of all rubbers with each other as far as possible.

The results evaluated on the properties of vulcanizate are shown in Table 1.

Reference Example 1

100 g of SBR #1502 was dissolved in 2 l of toluene and added with 2.15 g (0.01 mol) of p-bromomethyl benzoic acid. To the resulting mixed solution was added dropwise a solution of 1.10 g of tert-butylhypochloride in 40 ml of toluene at 75° C. over 10 minutes with stirring and the reaction was continued for 1 hour. Then, the reaction mixture was poured in 8 l of methanol containing 80 g of an antioxidant (2,6-di-tert-butyl-4-methyl phenol) to solidify the elastomer. The pieces of solidified elastomer were thoroughly washed with a fresh methanol containing the antioxidant and dried in a vacuum dryer over a night to obtain a modified copolymer.

TABLE 1

| Compounding recipe | Comparative Example 1 | Example 1 | Example 2 | Example 3 | Example 4 | Comparative Example 2 | Example 5 | Example 6 | Example 7 | Example 8 |
|---|---|---|---|---|---|---|---|---|---|---|
| unmodified SBR | 80 | — | — | — | — | 70 | — | — | — | — |
| brominated modified SBR | — | 80 | 80 | 80 | 80 | — | — | — | — | — |
| Chlorinated modified SBR | — | — | — | — | — | — | 70 | 70 | 70 | 70 |
| NR | 20 | 20 | 20 | 20 | 20 | — | — | — | — | — |
| BR | — | — | — | — | — | 30 | 30 | 30 | 30 | 30 |
| carbon black ISAF | 80 | 80 | 80 | 80 | 80 | 140 | 140 | 140 | 140 | 140 |
| ZnO | 3 | 3 | 3 | 3 | 3 | 3 | 3 | 3 | 3 | 3 |
| stearic acid | 2 | 2 | 2 | 2 | 2 | 2 | 2 | 2 | 2 | 2 |
| aromatic oil | 60 | 60 | 60 | 60 | 60 | 130 | 130 | 130 | 130 | 130 |
| amine series antioxidant | 0.5 | 0.5 | 0.5 | 0.5 | 0.5 | 0.5 | 0.5 | 0.5 | 0.5 | 0.5 |
| sulfenamide series accelerator | 1.5 | 1.5 | 1.5 | 1.5 | 1.5 | 2.0 | 2.0 | 2.0 | 2.0 | 2.0 |
| 4,4'-methylene biscyclohexyl amine | 2 | 2 | — | 5 | — | — | — | 1 | — | 4 |
| 4,4'-methylene dianiline | — | — | 2 | — | 5 | 1 | 1 | — | 4 | — |
| sulfur | 2.5 | 1.5 | 1.5 | 1.0 | 1.0 | 2.5 | 1.5 | 1.5 | 1.0 | 1.0 |
| Fracture strength at high temperature | 100 | 102 | 104 | 113 | 114 | 100 | 105 | 104 | 110 | 109 |
| Wron quantity | 100 | 74 | 78 | 62 | 62 | 100 | 87 | 85 | 68 | 67 |
| Blow-out temperature | 100 | 115 | 117 | 133 | 136 | 100 | 108 | 110 | 124 | 123 |
| Time causing blow-out | 100 | 186 | 188 | 247 | 259 | 100 | 144 | 147 | 210 | 208 |

Moreover, Comparative Example 1 is used as a control to Examples 1 to 4, and Comparative Example 2 is used as a control to Examples 5 to 8.

Examples 1–8, Comparative Examples 1–2

There were prepared rubber compositions according to a compounding recipe shown in the following Table As seen from the results of Table 1, the rubber compositions for high-speed running tire according to the invention exhibit excellent heat resistance, wear resistance and fracture strength at high temperature by the combination of the halogenated modified styrene-butadiene copolymer and the diamine even when compounding large amounts of carbon black and process oil, so that the invention can provide a tread rubber for high-speed running tire having improved resistance to cut and chipping.

What is claimed is:

1. A composition to be compounded into a rubber composition for tread in a high speed tire comprising:
   (a) 100 parts by weight of a rubber consisting of 60-100 parts by weight of a halogenated styrene-butadiene copolymer which has been modified to include p-halomethylbenzoyl group represented by the following formula:

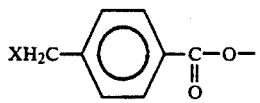

wherein X is a halogen atom selected from Cl, Br, I, and F, and 40-0 parts by weight of another conjugated diene polymer;
   (b) 70-190 parts by weight of carbon black;
   (c) 50-285 parts by weight of process oil; and
   (d) 0.3-10 parts by weight of a diamine having a carbon number of not more than 20, and selected from the group consisting of aliphatic primary diamine, alicyclic primary diamine, aromatic primary diamine, aralkyl primary diamine, heterocyclic primary diamine and polyether primary diamine.

2. The rubber composition according to claim 7, wherein said p-halomethylbenzoyl group is present within a range of 0.001-0.03 gram equivalent per 100 g of said styrene-butadiene copolymer.

3. The rubber composition according to claim 1, wherein said diamine is 4,4'-methylenebiscyclohexyl amine or 4,4'-methylene dianiline.

4. The rubber composition according to claim 1, wherein said carbon black is carbon black ISAF or SAF having a specific surface area of nitrogen adsorption of not less than 120 m²g.

5. The rubber composition according to claim 1, wherein said conjugated diene polymer is selected from natural rubber, polyisoprene rubber, emulsion-polymerized styrene-butadiene copolymer rubber, solution-polymerized styrene-butadiene copolymer rubber and polybutadiene rubber.

6. The rubber composition according to claim 1, wherein said aliphatic primary diamine is selected from the group consisting of hexamethylenediamine, 1-7-diaminoheptane, 1,10-diaminodecane, and 1,12-diaminododecane.

7. The rubber composition according to claim 1, wherein said alicyclic primary diamine is selected from the group consisting of 4,4'-methylene biscyclohexyl amine, 3,3'-dimethyl-4,4'-diaminocyclohexyl methane, and 1,3-bis(aminomethyl) cyclohexane.

8. The rubber composition according to claim 1, wherein said aromatic primary diamine is selected from the group consisting of 4,4'-methylene dianiline, 4,4'-diaminiodiphenyl methane, 4,4-diaminodiphenyl ether, 4,4'-diaminodiphenyl sulfone, p-phenylene diamine, and benzidine.

9. The rubber composition according to claim 1, wherein said aralkyl primary diamine is xylylene.

10. The rubber composition according to claim 1, wherein said heterocyclic primary diamine is 3,9-bis-(aminoalkyl)-2,4,8,10-tetraoxaspiro(5,5) undecane.

11. The rubber composition according to claim 1, wherein said polyether primary diamine is polyoxypropylene diamine having the following formula:

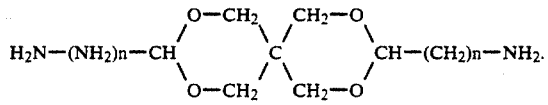

* * * * *